US008572331B2

(12) United States Patent
Butterworth et al.

(10) Patent No.: US 8,572,331 B2
(45) Date of Patent: Oct. 29, 2013

(54) METHOD FOR RELIABLY UPDATING A DATA GROUP IN A READ-BEFORE-WRITE DATA REPLICATION ENVIRONMENT USING A COMPARISON FILE

(75) Inventors: Henry Esmond Butterworth, Chandlers Ford (GB); Kenneth Fairclough Day, III, Tuscon, AZ (US); Philip Matthew Doatmas, Tuscon, AZ (US); John Jay Wolfgang, Winston-Salem, NC (US); Vitaly Zautner, Haifa (IL); Aviad Zlotnick, D.N.G.T. (IL)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 12/261,972

(22) Filed: Oct. 30, 2008

(65) Prior Publication Data

US 2009/0043826 A1  Feb. 12, 2009

Related U.S. Application Data

(63) Continuation of application No. 11/093,392, filed on Mar. 30, 2005, now Pat. No. 7,484,051, and a continuation of application No. 10/867,058, filed on Jun. 14, 2004, now Pat. No. 7,580,959.

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 7/00* | (2006.01) | |
| *G06F 17/00* | (2006.01) | |
| *G06F 11/00* | (2006.01) | |
| *G06F 11/16* | (2006.01) | |

(52) U.S. Cl.
USPC ........... 711/154; 711/162; 707/610; 707/624; 707/625; 707/626; 707/638; 707/640; 707/644; 707/646; 707/647; 707/648; 707/651; 707/674; 707/675; 707/678; 707/679; 707/681; 707/682; 707/683; 707/684; 707/685; 714/100; 714/1; 714/2; 714/4.11; 714/6.21; 714/6.3; 714/11; 714/15; 714/16; 714/19

(58) Field of Classification Search
None
See application file for complete search history.

(56) References Cited

U.S. PATENT DOCUMENTS

| | | | |
|---|---|---|---|
| 5,574,906 | A | 11/1996 | Morris |
| 5,649,196 | A | 7/1997 | Woodhill et al. |
| 6,014,676 | A | 1/2000 | McClain |
| 6,101,507 | A | 8/2000 | Cane et al. |
| 6,327,671 | B1 | 12/2001 | Menon |
| 6,356,961 | B1 | 3/2002 | Oprescu-Surcobe |
| 6,490,596 | B1 | 12/2002 | Micka |
| 6,618,851 | B1 * | 9/2003 | Zundel et al. ................. 717/103 |
| 6,633,905 | B1 | 10/2003 | Anderson et al. |
| 7,065,537 | B2 | 6/2006 | Cha et al. |

(Continued)

*Primary Examiner* — Sanjiv Shah
*Assistant Examiner* — Marwan Ayash
(74) *Attorney, Agent, or Firm* — Kunzler Law Group

(57) ABSTRACT

A method is disclosed for reliably updating a data group in a read-before-write data replication environment. The method reliably updates the data group by receiving an updated data group sent from a first storage medium to a second storage medium, comparing the updated data group with a previous data group previously existing on the second storage medium and writing the updated data group to the second storage medium. The read-before-write and differencing method disclosed maintain reliability by storing multiple copies of changes made to the second storage medium during and after the write process.

10 Claims, 6 Drawing Sheets

(56) References Cited

U.S. PATENT DOCUMENTS

| | | |
|---|---|---|
| 7,117,323 B1 | 10/2006 | Delaney |
| 2003/0212712 A1 | 11/2003 | Gu et al. |
| 2004/0054700 A1 | 3/2004 | Okada |
| 2004/0098420 A1 | 5/2004 | Peng |
| 2004/0117571 A1 | 6/2004 | Chang et al. |
| 2004/0186970 A1 | 9/2004 | Kekre et al. |
| 2004/0260734 A1 | 12/2004 | Ren et al. |
| 2005/0010576 A1 | 1/2005 | Ren et al. |
| 2005/0010870 A1 | 1/2005 | Gu et al. |
| 2005/0071386 A1 | 3/2005 | Wolfgang et al. |

* cited by examiner

METHOD FOR RELIABLY UPDATING A DATA GROUP IN A READ-BEFORE-WRITE DATA REPLICATION ENVIRONMENT USING A COMPARISON FILE

CROSS-REFERENCES TO RELATED APPLICATIONS

This application is a continuation of U.S. patent application Ser. No. 11/093,392 entitled "RELIABLY UPDATING A DATA GROUP IN A READ-BEFORE-WRITE DATA REPLICATION ENVIRONMENT USING A COMPARISON FILE" filed on Mar. 30, 2005 for Henry E. Butterworth et al., and claims priority to U.S. patent application No. 10/867,058 entitled "Apparatus, system, and method for providing efficient disaster recovery storage of data using differencing" and filed on Jun. 14, 2004 for Kenneth Boyd.

FIELD OF THE INVENTION

This invention relates to data replication and more particularly relates to reliably updating a data group in a data replication environment.

DESCRIPTION OF THE RELATED ART

Two important objectives of a data replication environment are first to maintain an accurate replica of a data group, and second to maintain a consistent replica of a data group. Maintaining accuracy requires that as data is copied from one storage medium to another, no errors are introduced. Maintaining consistency requires that as data is copied from one storage medium to another, no data is lost or omitted. Accuracy may be ensured in the case of data corruption or media failure by copying a consistent replica of the data from a backup source. Consequently, in a data replication environment, it is important to maintain an up-to-date copy of a data group.

There are two main types of data replication environments, a synchronous system and an asynchronous system. A synchronous system updates a second storage medium each time a first storage medium is updated. The update to the second storage medium is a part of the update transaction made on the first storage medium. Inconsistencies are less common in a synchronous system because less data is copied with each update to the second storage medium, and less time is required for the copy transaction to be completed. However, synchronous systems are often cumbersome because of the intense usage of network resources required to constantly update the second storage medium.

Asynchronous systems are often used as an alternative to synchronous systems. An asynchronous system copies an updated data group from a first storage medium to a second storage medium. The first storage medium does not send updates to the second storage medium until updates to the first storage medium are complete. Asynchronous systems are beneficial, because updates to the second storage medium are made less frequently. If one of the storage mediums fails during a data update, the data may be inconsistent. Additionally, if a consistent backup copy of the data is not available, data may be lost or corrupted as a consequence of system corruption or media failure.

From the foregoing discussion, it should be apparent that a need exists for an apparatus, system, and method that reliably update a data group in a data replication environment. Beneficially, such an apparatus, system, and method would provide a highly consistent backup replica of data stored in a data storage environment.

SUMMARY OF THE INVENTION

The present invention has been developed in response to the present state of the art, and in particular, in response to the problems and needs in the art that have not yet been fully solved by currently available data replication products. Accordingly, the present invention has been developed to provide a method for reliably updating a data group in a data replication environment that overcomes many or all of the above-discussed shortcomings in the art.

A method of the present invention is presented for reliably updating a data group in a data replication environment. The method in the disclosed embodiments substantially includes the steps necessary to carry out the functions presented above with respect to the operation of the described apparatus and system. In one embodiment, these steps include receiving an updated data group sent from a first storage medium to a second storage medium, comparing the updated data group with a previous data group previously existing on the second storage medium, and writing the updated data group to the second storage medium.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
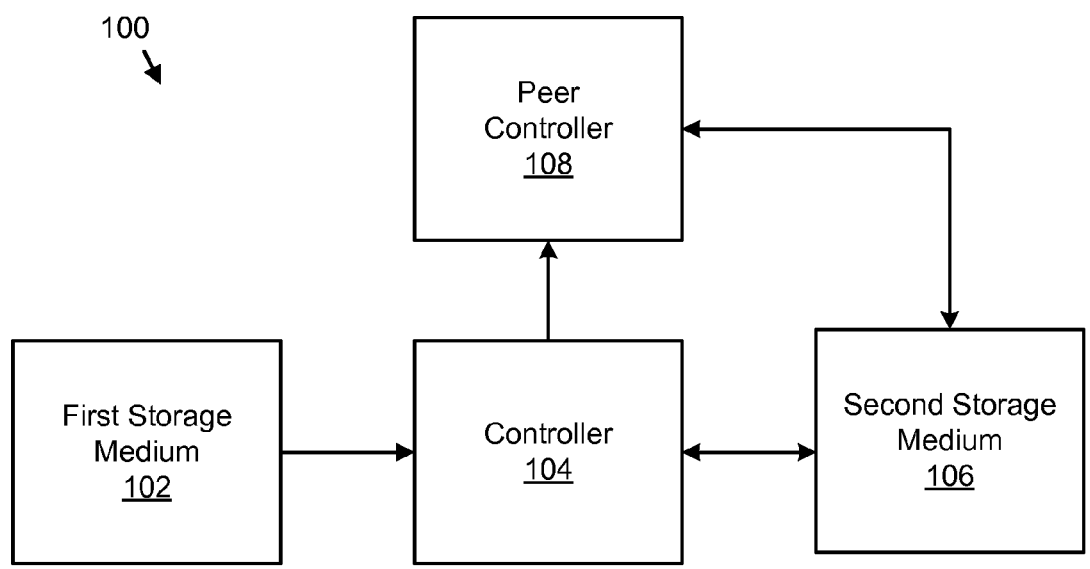
FIG. 1 is a schematic block diagram illustrating one embodiment of a system for reliably updating a data group in a data replication environment.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to 'one embodiment,' 'an embodiment,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a system 100 for reliably updating a data group in a data replication environment. In one embodiment, the system 100 includes a first storage medium 102, a controller 104, and a second storage medium 106. In such an embodiment, the first storage medium 102 sends updates to a second storage medium 106. The updates may be managed by a controller 104. In one embodiment, the system 100 may also include a peer controller 108 in communication with the controller 104 and the second storage medium 106.

In one embodiment, the first storage medium 102 is an IBM Enterprise Storage System™ (ESS). The first storage medium 102 may be part of a Storage Area Network (SAN), and receive updates from other computing devices on the SAN. Of course, the invention may be implemented using any suitable data storage medium. Application data stored on the first storage medium 102 may be extremely error sensitive. For example, a banking application may store data about banking transactions. If the data is corrupted, due to system failure or otherwise, significant financial consequences may follow. Therefore, it is desirable to maintain an accurate and consistent backup copy of the data on a second storage medium 106.

In one embodiment, the data stored on the first storage medium 102 is copied to a second storage medium 106. The second storage medium 106 maybe the same model as the first storage medium 102. Alternatively, the physical or software platform of the second storage medium 106 may be different from that of the first storage medium 102. Additionally, the first storage medium 102 and the second storage medium 106 may be separated by a large geographical distance. It is important that the second storage medium 106 maintain an accurate and consistent copy of the data stored on the first storage medium.

There are two primary methods for replicating data between a first storage medium 102 and a second storage medium 106. In synchronous systems the second storage medium 106 receives updates each time the first storage medium 102 is updated. In an asynchronous system, the second storage medium 106 receives a group of updates from the first storage medium 102 at one time. The first storage medium does not send updates to the second storage medium until updates to the first storage medium are complete. Generally, the first storage medium sends a group of data that has been updated to the second storage medium. Since only a portion of the data group may have been updated, the majority of the corresponding data group on the second storage medium may remain unchanged. In one embodiment, the data group is a track of data. A track may hold several kilobytes of data, but only a few bytes may have been updated. Still, in an asynchronous system, the entire track will be received by the second storage medium 106.

In one embodiment, a controller 104 manages updates to the second storage medium 106 from the first storage medium 102. The controller 104 may read the updated data group into memory and then update the second storage medium 106. The controller 104 may improve the reliability of updates made to the second storage medium 106. For example, if the second storage medium fails in the course of the update, the controller still maintains the updated data group or a comparison file containing update information in memory, and no data is lost. When the second storage medium 106 is recovered, the controller 104 can complete the updates.

In one embodiment, the controller 104 is physically separated from both the first storage medium 102 and the second storage medium 106. If the controller 104 is physically separated from the second storage device 106, the chance of data loss due to a power failure impacting both the controller 104 and the second storage medium 106 is minimized. In one embodiment, the controller 104 may include interfaces to multiple physical and software platforms. Including multiple interfaces provides for heterogeneity between the first storage medium and the second storage medium. For example, the first storage medium 102 may be an IBM system, and the second storage medium 106 may be a SUN system. In such an embodiment, the controller 104 provides interface compatibility between the two storage mediums that may not ordinarily be available. Additionally, a separate controller 104 may be highly portable. In an alternative embodiment, the controller 104 is collocated with the second storage medium. For example, the controller 104 may be incorporated in a data management server that controls the second storage medium 106.

The controller 104 may communicate a file containing comparison data to a peer controller 108. The peer controller 108 may be informed of actions taken by the controller 104 and data copied to the second storage medium 106 to maintain a consistent backup copy of the updated data set. For example, the controller 104 may inform the peer controller 108 as it prepares to write each portion of the data to the second storage medium 106. The controller 104 may also inform the peer controller 108 upon completion of the write operation. In one embodiment, the controller 104 may copy the updated data group to the peer controller 108 as a backup copy. In case of data corruption or media failure during the write operation, the peer controller 108 may restore the updated data group from the comparison file and other information sent by the controller 104. In one embodiment, the peer controller 108 may discard the data upon confirmation of a successful write operation.

Figure 2:
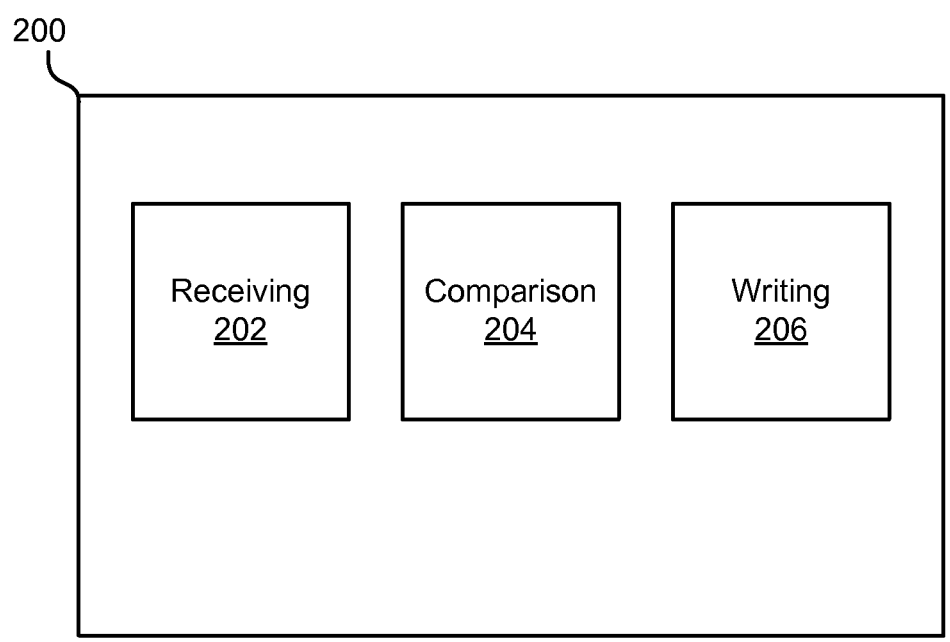
FIG. 2 is a schematic block diagram illustrating one embodiment of an apparatus for reliably updating a data group in a data replication environment.

FIG. 2 is a schematic block diagram illustrating one embodiment of an apparatus to reliably update a data group in a data replication environment. The apparatus 200 may include a receive module 202, a comparison module 204, and a write module 206. In one embodiment, the controller 104 may be an apparatus 200.

In one embodiment, the receive module 202 receives an updated data group sent from a first storage medium to a second storage medium. The receive module 202 may include interface components sufficient to receive data from the first storage medium 102. The receive module receives the updated data group as part of a Read Before Write (RBW) operation. RBW is an operation in which the data to be overwritten on the storage medium by an updated data group is read into a controller 104 as a secondary backup copy while the second storage medium 106 is updated.

In one embodiment, the comparison module 204 compares the updated data group with a previous data group stored on the second storage medium 106. The comparison module 204 creates a record of the changes made to the data on the second storage medium 106. In the case of a failure, the data group on the second storage medium 106 can be recovered to any previous state stored by the comparison module 204.

For example, at a given point in time the first storage medium 102 and the second storage medium 106 may contain consistent sets of data. Updates are made to the first storage medium 102, and the updated data groups are copied to the second storage medium 106. Before the updated data groups are copied, the receive module receives the updated data group and the comparison module 204 compares the updated data group with the previous data group stored on the second storage medium 106. A comparison file is created that contains the differences between the previous data group and the updated data group. If there are errors or inconsistencies during or after the update, the data on the second storage medium 106 can be recovered to the previous state using the comparison file.

In one embodiment, the write module 206 is configured to write the updated data group to the second storage medium 106. The write module 206 may include interfaces to multiple physical or software platforms. Providing interfaces to multiple platforms in the write module 206 increases heterogeneity in the system 100. The write module writes the updated data group to the second storage medium 106 upon completion of the data group comparison performed by the comparison module 204.

Figure 3:
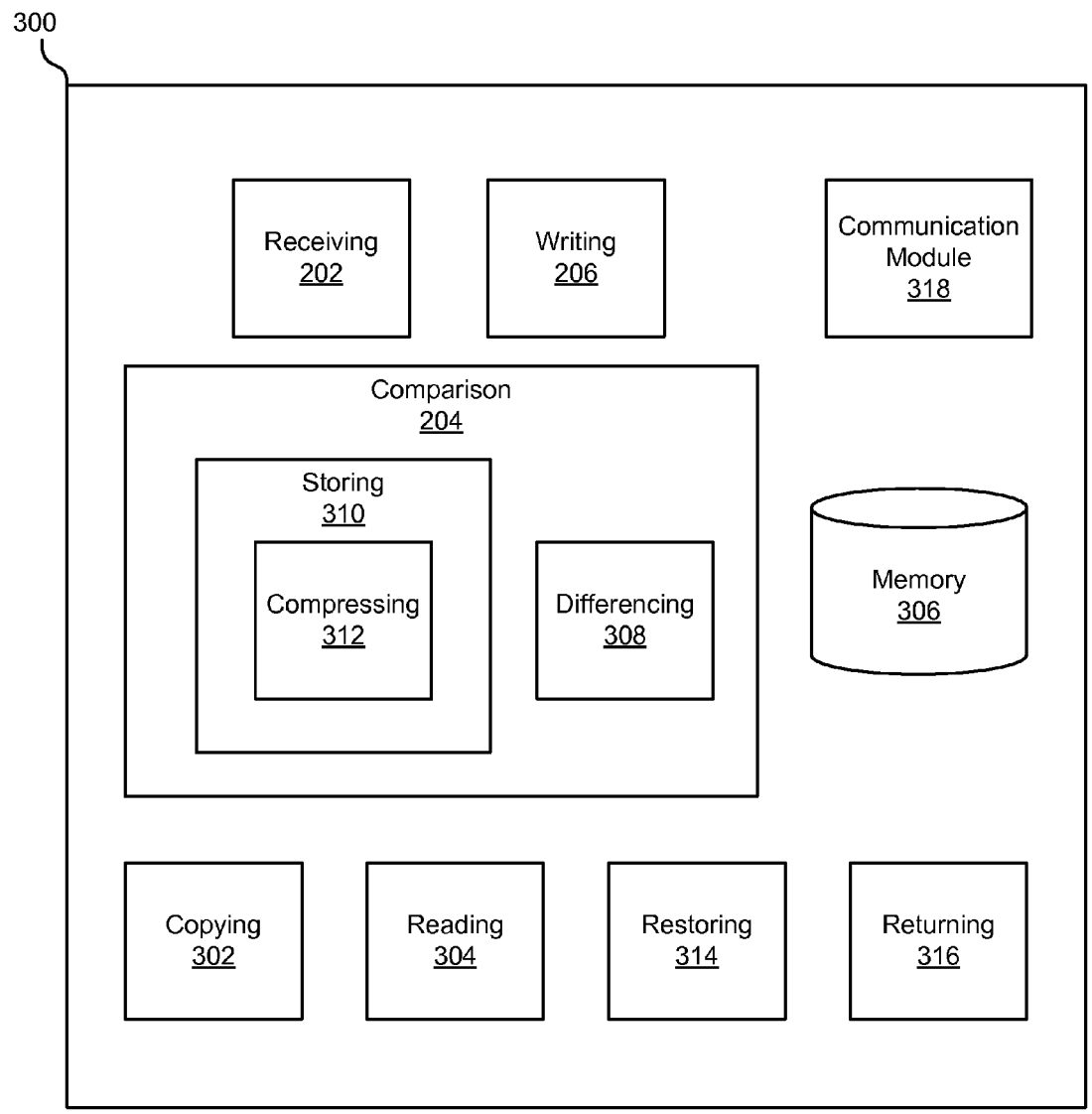
FIG. 3 is a detailed schematic block diagram illustrating another embodiment of an apparatus for reliably updating a data group in a data replication environment.

FIG. 3 is a detailed schematic block diagram of an apparatus 300 to reliably update a data group in a data replication environment. In one embodiment, the apparatus 300 includes a receive module 202, a comparison module 204, and a write module 206. Additionally, the apparatus 300 may include a copy module 302, a read module 304, an undo module 314, a redo module 316, and a memory 306. The comparison module 204 may additionally include a differencing module 308, a store module 310, and a compression module 312.

In one embodiment, the copy module 302 copies the previous data group from the second storage medium 106 into the memory 306. Copying the previous data group provides a baseline for the comparison module 204 to compare the updated data group against. In one embodiment, the memory 306 is Random Access Memory (RAM). The memory 306 may be volatile or nonvolatile memory. Alternatively, the memory 306 may be a magnetic or optical data storage device such as a hard disk, optical disk, tape drive, or the like. The copy module 302 may copy only a portion of data from the previous data group to be updated using differencing information stored in a comparison file. The contents of the comparison file are discussed further in relation to the differencing module 308, the store module 310, and the compression module 312. Reducing the amount of data updated at one time may beneficially reduce the storage and bus bandwidth requirements of the apparatus 300.

In one embodiment, the read module 304 reads the updated data group into the memory 306 prior to writing the updated data group to the second storage medium 106. Reading the updated data group may be performed as part of the RBW operation. The copy of the previous data group and the updated data group are read into the memory 306 for comparison of the data groups.

The differencing module 308 may use an Exclusive OR (XOR) command to compare the previous data group with the updated data group. Applying an XOR command to the two data sets provides a fast and highly compressible record of the differences between the previous data group and the updated data group. An XOR command compares bits and produces an output of '0' if the bits are the same or a '1' if the bits are different, regardless of the actual value of the bits being compared. For example, if the previous data group contained four binary bits '1001' and the updated data group contained four binary bits '1010', comparing these data groups with an XOR gate produces the result '0011'. The first two bits of the result are '0' because the first two bits of the two data groups are the same. The second two bits of the result are '1' because the second two bits of the data groups are different. Consequently, the XOR produces a record of all differences between the previous data group and the updated data group can. In one embodiment, the XOR may be a software or firmware command. In an alternative embodiment, the XOR command may be implemented by applying signals to a hardware XOR logic gate.

The store module 310, in one embodiment, stores the results of the differencing module 308 in a comparison file. One or more comparison files may be stored. In one embodiment, the comparison files are stored in memory 306. Alternatively, the comparison files may be stored on a hard disk or other storage medium. In another alternative embodiment, the store module 310 may store the comparison files on the second storage medium 106.

In one embodiment, the compression module 312 may compress the comparison file prior to the store module 310 storing the comparison file. The data in the comparison file is, in described embodiments, highly compressible. Additionally, when the invention is implemented in the manner described, relatively few updates will need to be made to the updated data group. Therefore, the changes to the previous data group may be few. As a result of the relatively few changes made, the differencing module produces a fewer '1' bits, representing the changes, and a majority of '0' bits representing no change. Since the comparison files typically contain a majority of zeroes and relatively few ones, the data is highly compressible.

In one embodiment, the undo module 314 is configured to restore a previous data group. In the case of data corruption, it may be desirable to recover a previous data group from the data stored on the second storage medium 106 and the data in a comparison file. The undo module 314 reads the updated data group from the second storage medium 106 and a comparison file into memory. The undo module then recovers the previous data group by applying an XOR to the updated data group and the comparison file. The undo module then writes the recovered previous data group back to the second storage medium 106.

The undo module 314, in one embodiment, recovers the previous data group by applying an XOR to an updated data group and a previously stored comparison file. The resulting previous data group is restored to the state of the previous data group at the time the differencing module created the comparison file. For exemplary purposes, the example above is continued. If the updated data group contains the bits '1010' and the comparison file contains the bits '0011,' the previous data group is recovered by applying another XOR to the updated data group and the comparison file. The result of the XOR is '1001.'

In one embodiment, the redo module 316 returns the restored previous data group to an updated state by applying an XOR to the restored previous data group and a comparison file. Multiple comparison files may be stored, provided that storage space is sufficient. It is therefore possible to roll forward or roll backward to different update states by applying an XOR command to the data on the second storage medium 106 and one of the comparison files. The ability to roll forward or backward in time may be useful in troubleshooting or product debugging. Using XOR comparison files is useful because it allows users to roll forward or backward in time sequences states of the data without requiring storage of full updated data groups.

In one embodiment, the communication module 318 communicates update information to a peer controller 108. In one embodiment, the update information includes the comparison file containing the results of the XOR differencing operation. Additionally, the update information may include updated data to be written to the second storage medium 106. In one embodiment, the communication module 318 may communicate the information directly to the peer controller 108 using a data transmission connection. Alternatively, the communication module 318 may communicate with the peer controller 108 by writing update information to a common storage device. For example, the communication module 318 may write the comparison file to a storage disk accessible by both the controller 104 and the peer controller 108.

Figure 4:
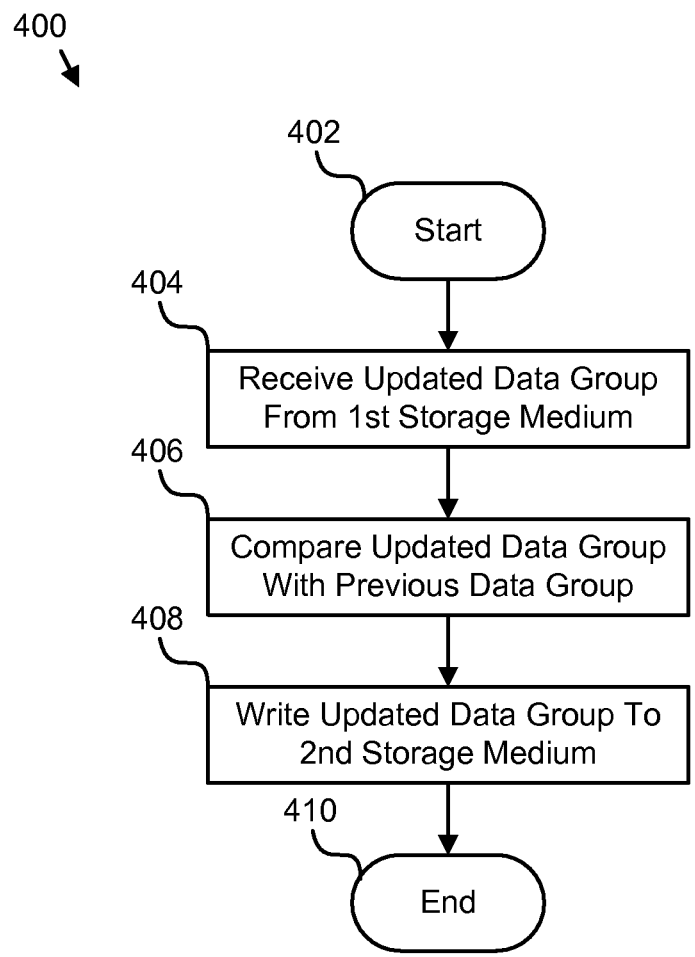
FIG. 4 is a schematic flow diagram illustrating one embodiment of a method for reliably updating a data group in a data replication environment.

FIG. 4 is a schematic flow chart diagram of a method 400 for reliably updating a data group in a data replication environment. The method 400 starts 402 when the receive module 202 receives 404 an updated data group from the first storage medium 102. The comparison module 204 then compares 406 the updated data group with the previous data group stored on the second storage medium 106. In one embodiment, a file containing comparison information is stored for reference. The write module 206 then writes 408 the updated data group to the second storage medium 106, and the method ends 410.

Figure 5:
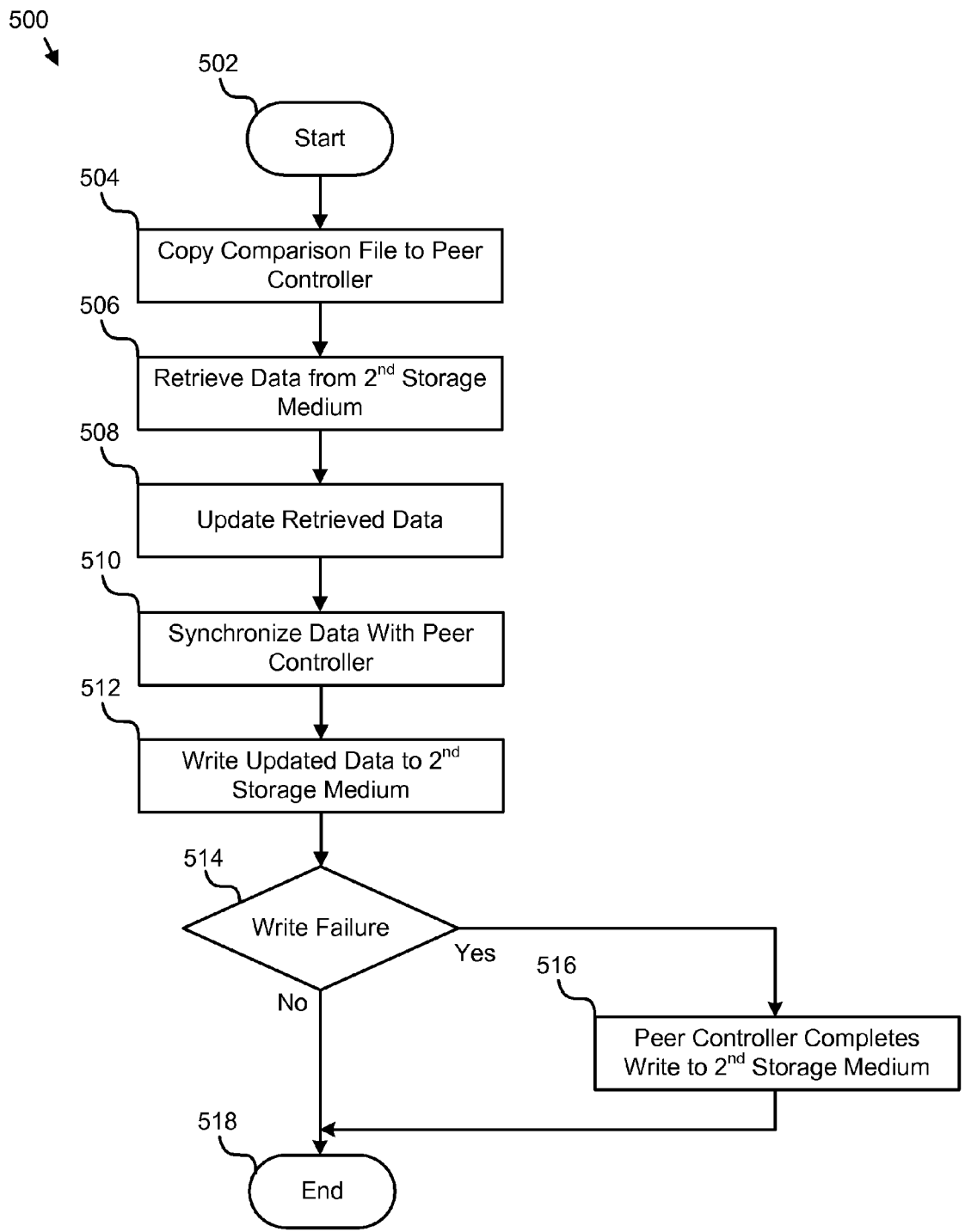
FIG. 5 is a schematic flow diagram illustration one embodiment of a method for reliably writing data in a data replication environment.

FIG. 5 is a schematic flow diagram of a method 500 to reliably write data in a data replication environment. The method 500 starts 502 when the communication module 318 communicates 504 update information, including a comparison file, to a peer controller 308. Then the copy module 302 retrieves 506 data from the second storage medium 106. In one embodiment, the copy module 302 may copy only a portion of the previous data group. Next, the retrieved data is updated 508 by applying an XOR command to the retrieved data and a corresponding portion of the comparison file. The communication module 318 then synchronizes 510 the updated data with the peer controller 108. The write module 206 writes 512 the updated data to the second storage medium 106. If a write failure occurs 514, the peer controller 108 completes 516 the write operation to the second storage medium 106 with data obtained during synchronization 512 with the controller, and the method 500 ends. If no write failure occurs 514, the write module 206 completes the write 512 and the method 500 ends 518.

Figure 6:
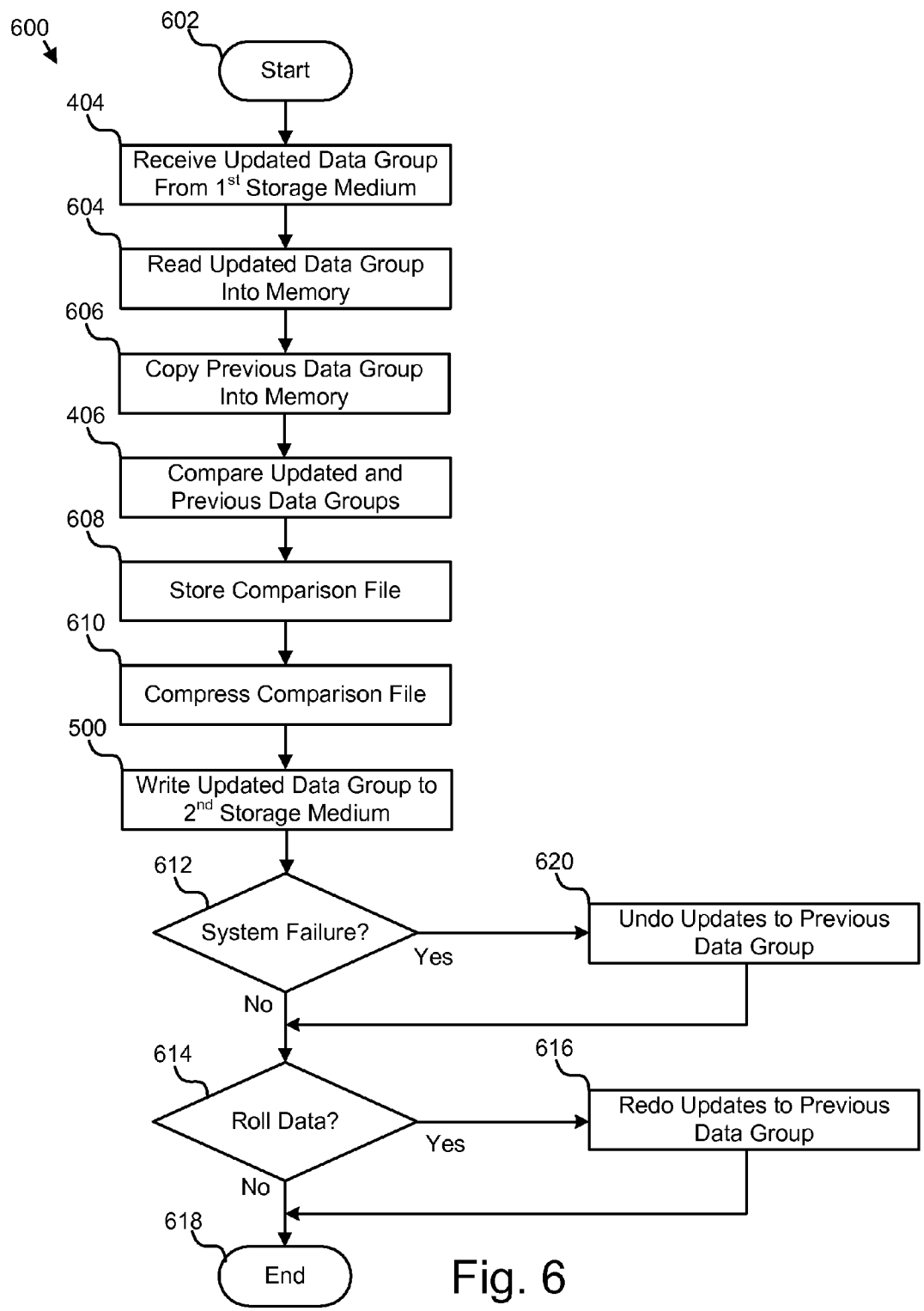
FIG. 6 is a detailed schematic flow diagram illustrating another embodiment of a method for reliably updating a data group in a data replication environment.

FIG. 6 is a detailed schematic flow diagram describing one embodiment of a method 600 for reliably updating a data group in a data replication environment. The method 600 starts 602 when the receive module 202 receives 404 an updated data group from the first storage medium 102. Then the read module 302 reads 604 the updated data group into memory 306. The copy module 304 then copies 606 the previous data group from the second storage medium 106 into memory 306. In one embodiment, the differencing module 308 then compares 406 the updated data group and the previous data group using an XOR command. The store module 310 then stores the resulting comparison file. The store module 310 may also store the comparison file on a peer controller 108. In one embodiment, the compression module 312 may then compress 610 the comparison file. In one embodiment, the write module 206 may inform the peer controller 108 that it is preparing to write the updated data group to the second storage medium 106. The write module 206 then writes 408 the updated data group to the second storage medium 106. The write module 310 may also write 408 the updated data group to the peer controller 108. In one embodiment, the write module 310 may inform the peer controller 108 upon completion of the write 408 operation.

If a system failure or corruption occurs 612 in the second storage medium 106, the undo module 314 may restore 620 the previous data group. In one embodiment, the updated data group is restored 620 from data sent to the peer controller 108 by the write module 310. If it is determined 614 that the data group needs to be rolled forward, then the return module 316 may return 616 the data group stored on the second storage medium 106 to a state stored in the comparison files. If the previous data group is restored with an undo 620 or returned with a redo 616 to an updated state, or if it is determined the neither is required, then the process 600 ends 618.

For example, the first storage medium 102 and the second storage medium 106 may each contain five tracks of data labeled 1 through 5 respectively for demonstrative purposes. The five tracks of data stored on the first storage medium 102 may be updated by an application in communication with the five tracks of data. In this example, the updated data group comprises the five tracks of data that have been updated and are stored on the first storage medium 102, and the previous data group comprises the five unmodified tracks of data previously existing on the second storage medium 106. For data consistency, the first storage medium 102 must communicate the updated data group to the second storage medium 106.

In such an example, it is beneficial to use a controller 104 to manage communication of the updated data group from the first storage medium 102 to the second storage medium 106. One method for communicating updates from the first storage medium 102 to the second storage medium 106 is to communicate all five of the updated data group tracks. The controller 104 receives 404 the updated tracks of data comprising the updated data group from the first storage medium 102. The read module 304 then reads 604 the five updated tracks of data into a memory 306 such as a disk drive. The copy module 302 may then copy 606 the five tracks of data previously existing on the second storage medium 106 onto disk drive 306. The differencing module 308 may then XOR 406 the updated tracks of data with the previous tracks of data to obtain a comparison file. The store module 310 may then store 608 the comparison file on a data storage device 306 such as disk drive, and the compression module 312 may compress 610 the comparison file. Once the comparison file is obtained, the updated data group is written to the second storage medium 106. The updated data group and the previous data group may then be deleted from the disk drive 306.

In the example described above, the comparison module 318 may instruct the store module 310 to store 608 the comparison file on a disk drive in communication with both the controller 104 and a peer controller 108. In such an example, the comparison file is accessible by both the controller 104 and the peer controller 108.

In certain situations, it may be desirable to update only a portion of the previous data tracks at one time. For example, the five updated data tracks and the five previous data tracks may be deleted from the disk drive 306 to minimize storage requirements. Additionally, writing only a portion of the updates to the second storage medium 106 at one time may reduce bus bandwidth requirements. In this example, the copy module 302 may copy 302 only the first track from the second storage medium 106 to which updates are to be made. An XOR is then applied to the comparison file containing update information and the first track of the previous data group. The result of this XOR command is the updated track to be written 408 back to the second storage medium 106.

The communication module 318 may then synchronize 510 the result of the second XOR command containing the updated track to be written 408 back to the second storage medium 106 with the peer controller 108. The complete updated track may be communicated to the peer controller 108 in case of a failure on the controller 104. The write module 206 may then begin to write 408 the updated first data track back to the second storage medium 106. The process described above may continue until each of the tracks of data previously existing on the second storage medium 106 have been updated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A program of executable code stored on a non-transitory storage device and executed by a processor to perform operations to reliably update a data group in a read-before-write replication environment, the operations comprising:
   receiving at a storage controller separate from a first non-volatile storage medium an updated data group sent from the first non-volatile storage medium in a read-before-write operation, wherein the updated data group comprises unchanged data values and updated data values to replace previous data values;
   copying a previous data group stored on a second non-volatile storage medium separate from the first non-volatile storage medium into a controller memory of the storage controller;
   comparing the updated data group with the previous data group;
   wherein the updated data group is compared with the previous data group by applying an Exclusive OR (XOR) command;
   storing results of the comparison of the updated data group and the previous data group in a comparison file, the comparison file comprising the differences between updated data values in the updated data group and the previous data values in the previous data group;
   compressing the comparison file;
   communicating the comparison file and the updated data group to a peer controller;
   initiating a write process wherein the storage controller writes the updated data group to a t-he second non-volatile storage medium; and
   detecting a failure of the write process of the updated data group to the second nonvolatile storage medium, wherein the peer controller is configured to complete the read-before- write operation in place of the storage controller.

2. The program of claim 1, the operations further comprising informing the peer controller prior to writing the updated data group to the second non-volatile storage medium.

3. The program of claim 1, the operations further comprising informing the peer controller that the updated data group is written to the second non-volatile storage medium.

4. The program of claim 3, the operations further comprising discarding the updated data group from the peer controller when the peer controller is informed that the updated data group was written to the second non-volatile storage medium.

5. The program of claim 1, the operations further comprising: reading the updated data group from the second non-volatile storage medium and the comparison file into the controller memory of the storage controller; recovering the previous data group from the updated data group and the comparison file; and writing the recovered previous data group to the second non-volatile storage medium.

6. The program of claim 5, wherein the previous data group is recovered from the updated data group and the comparison file by applying the Exclusive OR (XOR) command to the updated data group and the comparison file.

7. The program of claim 5, the operations further comprising: determining to roll forward the updated data group; recovering the updated data group from the previous data group and the comparison file; and writing the recovered updated data group to the second non-volatile storage medium.

8. A method for reliably updating a data group in a read-before-write replication environment, the method performed by executable code stored on a non-transitory storage device and executed by a processor and comprising:
receiving at a storage controller separate from a first non-volatile storage medium an updated data group sent from the first nonvolatile storage medium in a read-before-write operation, wherein the updated data group comprises unchanged data values and updated data values to replace previous data values:
copying a previous data group stored on a second non-volatile storage medium into a controller memory of the storage controller;
comparing the updated data group with the previous data group using an Exclusive OR (XOR) command;
storing results of the comparison of the updated data group and the previous data group as a comparison file, the comparison file comprising the differences between updated data values in the updated data group and the previous data values in the previous data group;
compressing the comparison file;
informing a peer controller prior to writing the updated data group to the second nonvolatile storage medium, the peer controller configured to complete the read-before write operation for the storage controller in case of failure;
communicating the comparison file and the updated data group to the peer controller;
synchronizing the updated data group to the peer controller;
writing the updated data group to the second non-volatile storage medium;
informing the peer controller that the updated data group is written to the second non-volatile storage medium;
discarding the updated data group from the peer controller upon being informed that the updated data group was successfully written to the second non-volatile storage medium;
detecting a system failure;
reading the updated data group from the second non-volatile storage medium and the comparison file into the controller memory;
recovering the previous data group from the updated data group and the comparison file using an XOR command; and
writing the recovered previous data group to the second non-volatile storage medium. 14.

9. The method of claim 8, the operations further comprising: reading the updated data group from the medium and the comparison file into the controller memory; recovering the previous data group from the updated data group and the comparison file; and writing the recovered previous data group to the second non-volatile storage medium.

10. The method of claim 9, the operations further comprising: determining to roll forward the updated data group; recovering the updated data group from the previous data group and the comparison file using an XOR command; and writing the recovered updated data group to the second non-volatile storage medium.

* * * * *